(12) United States Patent
Wu

(10) Patent No.: US 7,536,582 B1
(45) Date of Patent: *May 19, 2009

(54) FAULT-TOLERANT MATCH-AND-SET LOCKING MECHANISM FOR MULTIPROCESSOR SYSTEMS

(75) Inventor: Yuguang Wu, Morganville, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/527,064

(22) Filed: Sep. 26, 2006

Related U.S. Application Data

(63) Continuation of application No. 10/822,954, filed on Apr. 12, 2004, now Pat. No. 7,171,581, which is a continuation of application No. 09/707,474, filed on Nov. 7, 2000, now Pat. No. 6,742,135.

(51) Int. Cl.
*G06F 11/00* (2006.01)

(52) U.S. Cl. .................. 714/4; 710/200; 711/164

(58) Field of Classification Search ................. None
See application file for complete search history.

(56) References Cited

U.S. PATENT DOCUMENTS

| | | | | | |
|---|---|---|---|---|---|
| 4,979,105 | A | * | 12/1990 | Daly et al. ............... | 714/10 |
| 5,305,448 | A | * | 4/1994 | Insalaco et al. .......... | 711/164 |
| 5,432,929 | A | * | 7/1995 | Escola et al. ............ | 707/9 |
| 5,615,373 | A | * | 3/1997 | Ho ........................ | 710/200 |
| 5,623,670 | A | * | 4/1997 | Bohannon et al. ......... | 710/200 |
| 5,623,671 | A | * | 4/1997 | Ando et al. .............. | 710/200 |
| 5,664,088 | A | * | 9/1997 | Romanovsky et al. ...... | 714/13 |
| 5,669,002 | A | * | 9/1997 | Buch ..................... | 710/200 |
| 5,742,785 | A | * | 4/1998 | Stone et al. ............. | 712/217 |
| 5,872,981 | A | * | 2/1999 | Waddington et al. ...... | 710/200 |
| 5,892,954 | A | * | 4/1999 | Tomas et al. ............ | 710/200 |
| 5,892,955 | A | * | 4/1999 | Ofer ..................... | 710/200 |
| 6,112,222 | A | * | 8/2000 | Govindaraju et al. ..... | 718/102 |
| 6,223,335 | B1 | * | 4/2001 | Cartwright et al. ...... | 717/100 |
| 6,301,676 | B1 | * | 10/2001 | Kumar et al. ............ | 714/11 |
| 6,374,362 | B1 | * | 4/2002 | Ohtsu .................... | 714/4 |
| 6,539,446 | B1 | * | 3/2003 | Chan ..................... | 710/200 |
| 6,553,512 | B1 | * | 4/2003 | Gibson ................... | 714/17 |

* cited by examiner

*Primary Examiner*—Gabriel L Chu

(57) ABSTRACT

A match-and-set lock has a locked operating state and an unlocked operating state controlled by the value C. The lock returns a value R=C, to an inquiring user seeking access to the resource. A return value R=0 denotes that the resource is free, and a return value R≠0 denotes that the resource is locked by another user. The lock is responsive to a command in the form (A, B) to B for C if A=C. Thus, the lock may be locked by issuing the command (A, B) where A=C and B≠0; and the lock may be released by issuing the command (A, B) where A=C and B=0. A deadlock condition may be avoided by setting the lock to the value B=P+T*(N+1), where P<(N+1) and identifies the user issuing this command (A, B), and T is the current global time stamp when the user issues this command.

3 Claims, 5 Drawing Sheets

FAULT-TOLERANT MATCH-AND-SET LOCKING MECHANISM FOR MULTIPROCESSOR SYSTEMS

This is a continuation of U.S. patent application Ser. No. 10/822,954, filed Apr. 12, 2004 now U.S. Pat. No. 7,171,581, which is a continuation of Ser. No. 09/707,474 filed Nov. 7, 2000 U.S. Pat. No. 6,742,135, issued May 25, 2004.

FIELD OF THE INVENTION

The present invention relates generally to a fault tolerant locking mechanism and to the use of such a mechanism in preventing deadlocks in multiprocessor computer systems.

BACKGROUND OF THE INVENTION

As used herein, the term computer includes any device or machine capable of accepting data, applying prescribed processes to the data, and supplying the results of the processes. A multiprocessing computer system has multiple processes executing on the system. Each process performs a particular task, and the processes, taken as a whole, perform some larger task, typically called an application. These processes may be executing on a single central computer or they may be running on separate computers which are connected to each other via some type of communications link, i.e., a distributed or networked computer system.

In multiprocessing systems, resources are often shared among the executing processes. Such resources may include, for example, disk drives, printers, shared memory and databases. During processing, a process may require exclusive access to a resource, such that another process may not use that resource until the first process is finished with it. Thus, several processes may compete for a finite number of resources. This is commonly known as mutually exclusive sharing of resources.

A problem with mutually exclusive access to resources is the possibility that the computer system will enter a deadlock state. A deadlock state is a state in the computer system in which, because of a resource allocation pattern, the computer system cannot progress past a processing point. For example, consider a computer system with two resources R1 and R2, and two processors P1 and P2, where P1 and P2 both need simultaneous exclusive access to R1 and R2 at some point in order to successfully complete their processing. If P1 gains exclusive access to R1 and R2, then P2 must wait until P1 releases the resources. In this situation, P2 is described as being in a "wait" state. Such a situation does not present a problem, because, it is presumed, that P1 will eventually release the resources, at which time P2 may gain access to the resources. However, consider the situation in which P1 gains access to and holds R1, and P2 gains access to and holds R2, as shown in FIG. 1. If this occurs, then P1 cannot finish its task until it gains access to R2, and P2 cannot finish its task until it gains access to R1, i.e., both P1 and P2 will enter a wait state. However, P1 is holding R1 and will not release R1 until it gains access to R2, and P2 is holding R2 and will not release R2 until it gains access to R1. At this point, the system is in a deadlock state.

Systems and mechanisms for deadlock avoidance and recovery are known in the art and described in U.S. Pat. No. 5,664,088 to Romanovsky et al. and U.S. Pat. No. 5,913,060 to Discavage.

Generally, in the prior art, once a deadlock is detected, one of the processes involved in the deadlock is terminated, so that it releases the resource it held, and the resource can be reclaimed by the system. The reclaimed resource may then be used by a waiting process. If the waiting process can finish processing using the reclaimed resource, then the system can progress past the deadlock state. The terminated process, called the victim, is generally selected on a random basis, or based on a static priority assigned to the processes.

In addition to the "circular" deadlock situation shown in FIG. 1, a deadlock may also be caused by processors failing, or "crashing," before they release a resource. For example, in the same two processor system described above, assume processor P1 holds resource R1, and processor P2 holds resource R2 and is waiting for R1, as shown in FIG. 2. If processor P1 then unexpectedly crashes while still holding resource R1, P2 remains in a wait state, aware that R1 is busy, but not aware that P1 has crashed. Thus, P2 will wait forever for R1, which is being held by crashed processor P1, causing a deadlock state. Since prior art deadlock avoidance schemes are based on the assumption that processors will never malfunction, these schemes will not prevent deadlocks caused by crashing processors.

In any distributed or parallel computer system, access to shared resources is controlled by some form of a locking mechanism or scheme, whereby a shared resource is committed to, or "locked" by, a single holding processor until that processor releases the resource (i.e., releases the "lock"). To make such a system fault-tolerant, when a lock holding processor (i.e., a processor that has locked a resource) unexpectedly crashes, a rescuing method is needed to prevent system deadlock. The rescue operation will inherently be determined by the locking scheme. Problems may arise when two or more processors try to rescue the same locked resource. The correct behavior is that exactly one of them would succeed. Thus, there is a need for a generic fault-tolerant locking mechanism or scheme that can avoid deadlocks caused by failing processors in a multiprocessor system, especially mission-critical parallel systems where high availability is absolutely necessary. Such a mechanism will enable waiting processors to identify a locked resource held by a failed processor, and "rescue" the resource from the hold of its failed processor, by changing, or "re-setting," a lock associated with the resource. A single waiting processor will then rescue a resource to prevent the potential deadlock from locking up all other processors waiting for the same resource.

SUMMARY OF THE INVENTION

In a preferred embodiment, the present invention is a match-and-set lock for controlling access to a resource that is shared among a plurality of users N. The lock has a locked operating state and an unlocked operating state controlled by a value C such that the lock is in its locked operating state when $C \neq 0$ and in its unlocked operating state where $C = 0$. The lock returns a value R, equal to the lock's current content C, to an inquiring user seeking access to the resource. A return value $R = 0$ usually denotes that the resource is free, and a return value $R \neq 0$ denotes that the resource is locked by another user. The lock is responsive to an atomic command in the form (A, B), such that the lock substitutes B for C if $A = C$. Thus, the lock may be obtained/locked by issuing the command (A, B) where $A = C$ and $B \neq 0$; and the lock may be released by issuing the command (A, B) where $A = C$ and $B = 0$.

In accordance with the invention, a deadlock condition may be avoided by setting the lock to the value $B = P + T^*(N+1)$. Here N is the total number of users, P is an integer within $[1, N]$ that identifies the current user issuing the command (A, B), and T is the current global time stamp. When the lock is set in this fashion, a return value of $R \neq 0$, identifies the user currently locking the resource (via P'=R mod (N+1)) and the time when that user locked the resource (via T'=R/(N+1)). If the inquiring user determines that the user currently locking the resource has failed or restarted since locking the resource, this inquiring user can reset the lock by issuing the command (R, B). Here B=P+T*(N+1), P identifies this new user issuing the command, and T is the current time stamp; in so doing, the inquiring user gains access to the resource. If there are multiple users trying to issue this type of command (R, B) (of course, with different values of B for each inquiring user), then exactly one of them will succeed. This is because the very first of them that has succeeded will have changed the content of the lock to something different from R, causing all others to fail. When the inquiring user is finished with the resource, the user can reset the current content of the lock to C=0, to signal to other users that the resource is again free. The plurality of users may be processors in a multiprocessor computer system, and the processors may form a telecommunications system.

In another preferred embodiment, the invention is a software program implemented in a multiprocessor computer system, the software program controlling access to a shared resource from a plurality of processors N, by employing a match-and-set lock that has a current content C and that is responsive to a match-and-set command (A, B) that writes B into the current content if A=C. The lock commits the shared resource to the control of that processor that most recently set the current content to a non-zero value. The software program enables the multiprocessor system to: (a) initialize the lock by setting the current content to zero; (b) issue from one of the processors a command (M, S) where M equals an expected current content of the lock and S=P+T*(N+1) where P<(N+1) and identifies the processor issuing the command and T is a current time stamp; (c) if a non-zero value R is returned from the lock, identify the processor that set the lock as P'=R % (N+1) where R % (N+1) is the remainder of R, mod (N+1), and identify the approximate locking time as T'=R/(N+1); (d) if processor P' is still operating and was last started before time T', repeat step (b); in the alternative, (e) if processor P' is not still operating or was last started after time T', issue from processor P the command (M, S) where M=R. The users may be processors in a multiprocessor computer system, and the processors may form a telecommunications system.

In still another preferred embodiment, the invention is a method for controlling access to a shared resource from a plurality of processors N, comprising the steps of: (a) providing the resource with a locking storage function, wherein the function stores either an initial value denoting that the resource is not currently held by a processor or a value denoting a holding processor, currently holding the resource, if any, and an initial holding time when such holding began; (b) initializing the function by storing an initial value denoting that the resource is not currently held by a processor; (c) querying the function to determine if the resource is currently held by a processor; (d) if the resource is not currently held by a processor, providing to an inquiring processor access to the resource and resetting the value of the function to denote the inquiring processor's identity and a current time; in the alternative, (e) if the resource is currently held by a processor, determining if the holding processor has failed or been restarted since taking hold of the resource; (f) if the holding processor has failed or been restarted since taking hold of the resource, providing to the inquiring processor access to the resource and resetting the value of the function to denote the inquiring processor's identity and a current time; in the alternative, (g) if the holding processor has not failed or been restarted since taking hold of the resource, repeating steps (b) through (d); and (h) upon release of the resource, resetting the value stored in the function to an initial value denoting that the resource is not currently held by a processor. The plurality of processors N may form a telecommunications system.

In still another preferred embodiment, the invention is a method of controlling access to a shared resource from a plurality of processors N, the method employing a match-and-set lock that has a current content C and that is responsive to a match-and-set command (A, B) that writes B into the current content if A=C. The lock commits the shared resource to the control of that processor that most recently set the current content to a non-zero value. The method comprises the steps of: (a) initializing the lock by setting the current content to zero; (b) issuing from one of the processors a command (M, S) where M equals an expected current content of the lock and S=P+T*(N+1) where P<(N+1) and identifies the processor issuing the command and T is a current time stamp; (c) if a non-zero value R is returned from the time lock, identifying the processor that set the lock as P'=R % (N+1) where R % (N+1) is the remainder of R, mod (N+1), and identifying the approximate locking time as T'=R/(N+1); (d) if processor P' is still operating and was last started before time T', repeating step (b); in the alternative, (e) if processor P' is not still operating or was last started after time T', issuing from processor P the command (M, S) where M=R. The plurality of processors N may form a telecommunications system.

Using pseudo algorithmic language, the invention of fault-tolerant locking mechanism can be summarized as follows: here time( ) returns the current global time, N is the total number of users, my_id( ) returns the calling user's id (between 1 and N), alive(p) returns TRUE is user p is still running, and start_time(p) returns the latest reboot time of user p.

Lock:
    M=0;
    S=my_id( )+time( )*(N+1);
    While ((R=match-and-set(M, S)) !=M) {
        Who=R % (N+1);
        When=R/(N+1);
        If (!alive(who)||start_time(who)>when)
            M=R;
        Else
            M=0;
        S=my_id( )+time( )*(N+1);
Unlock:
    match-and-set(0, S).

BRIEF DESCRIPTION OF THE DRAWINGS

The present invention will be understood and appreciated more fully from the following detailed description, taken in conjunction with the drawings in which.

DETAILED DESCRIPTION OF THE PREFERRED EMBODIMENTS

Reference is now made to FIGS. 3 through 7, which are block diagrams illustrating the general operation of a match-and-set lock in a preferred embodiment of the present invention. The lock has a locked operating state and an unlocked operating state controlled by a value C such that the lock is in its locked operating state when C≠0 and in its unlocked operating state where C=0. The lock returns a value R, equal to the lock's current content C, to an inquiring user seeking access to the resource. A return value R=0 denotes that the resource is free, and a return value R≠0 denotes that the resource is locked by another user. When the return value R≠0, R identifies the user currently locking the resource and the time when that user first locked the resource. More particularly, in accordance with the invention, R=P+T*(N+1) where N is the number of users, P<(N+1) is the identifier of the user who locked the resource and T is the current time stamp at the time the resource was locked. General requirements of the environment in which the match-and-set lock is applied are that: there is a global reference time, and any user can determine whether any other user is currently running or has crashed, as well as the time of each user's latest reboot time. Note that all these data are easy to implement: every user maintains a reboot time stamp; upon coming online, the user would read from the global time clock and save in its time stamp.

Figure 1:
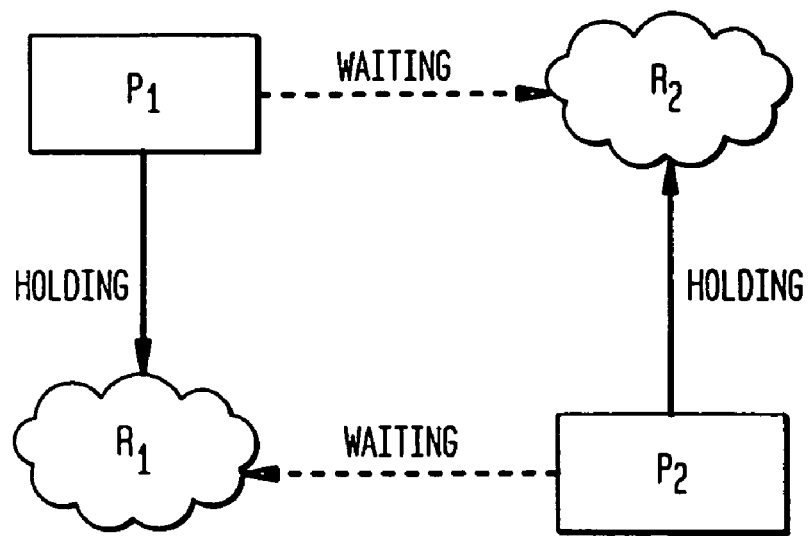
FIG. 1 is a block diagram illustrating a multiprocessor system in a typical deadlock state.
Figure 2:
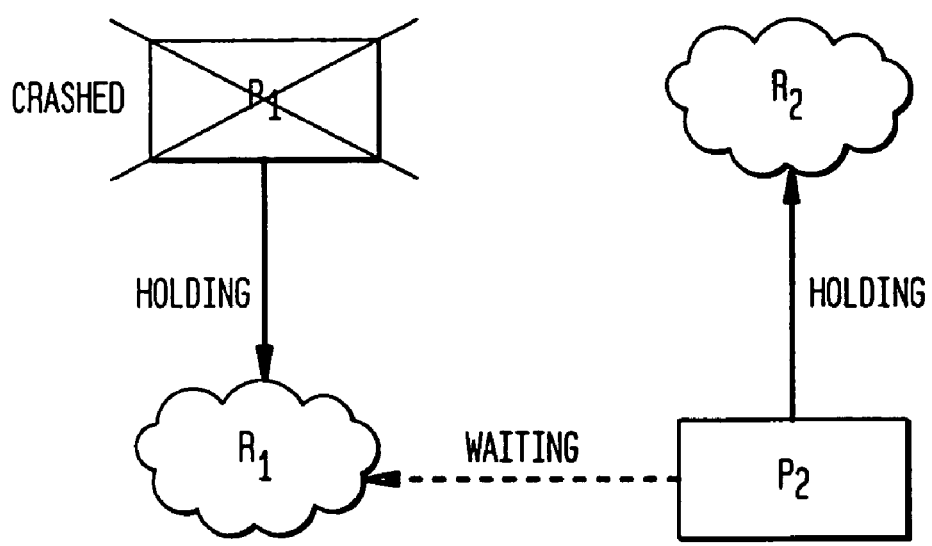
FIG. 2 is a block diagram illustrating a multiprocessor system in a deadlock state caused by a failed processor.
Figure 3:
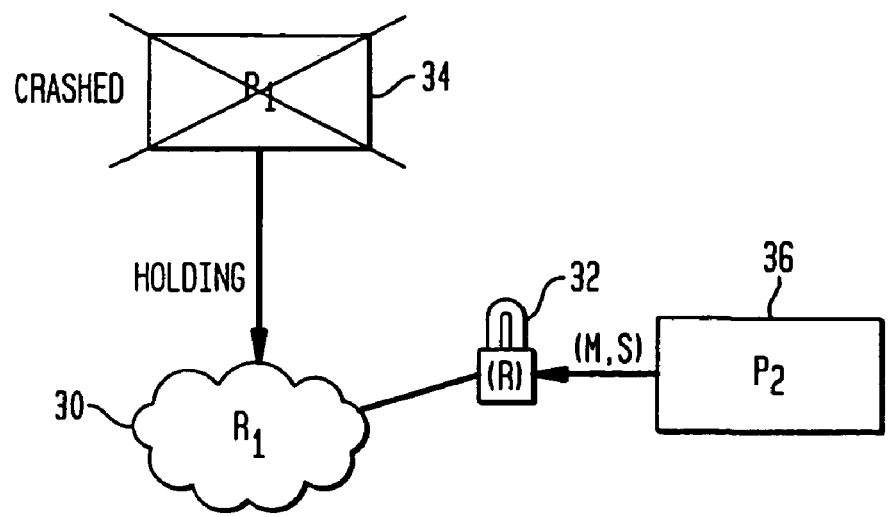
FIGS. 3-7 are block diagrams illustrating the general operation of a match-and-set lock in a preferred embodiment of the present invention.

In FIG. 3, a shared resource 30 has a match-and-set lock 32, which has a current content R. The lock is responsive to a match-and-set command (M, S) that writes S into the current content if M=R, and commits the shared resource 30 to the control of the processor that most recently set the current content of the lock to a non-zero value. In FIG. 3, processor 34 has gained access to the resource, and the current content R of lock 32 denotes that processor 34 has locked resource 30 at a time T'. However, processor 34 has unexpectedly crashed while still holding resource 30. Some time later, inquiring processor 36, in an attempt to gain access to resource 30, issues a match-and-set command (M, S) to lock 32, where M=0, and S denotes the identity of processor 36 and the current time.

Figure 4:
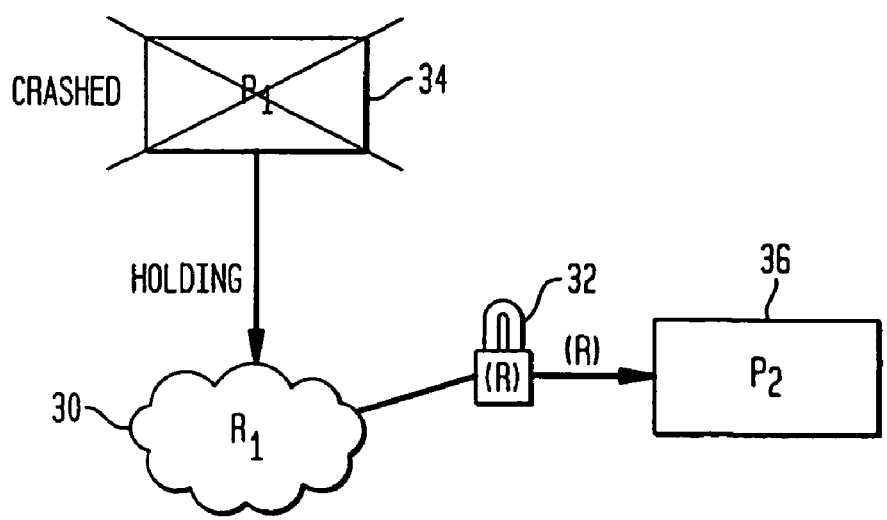
Figure 5:
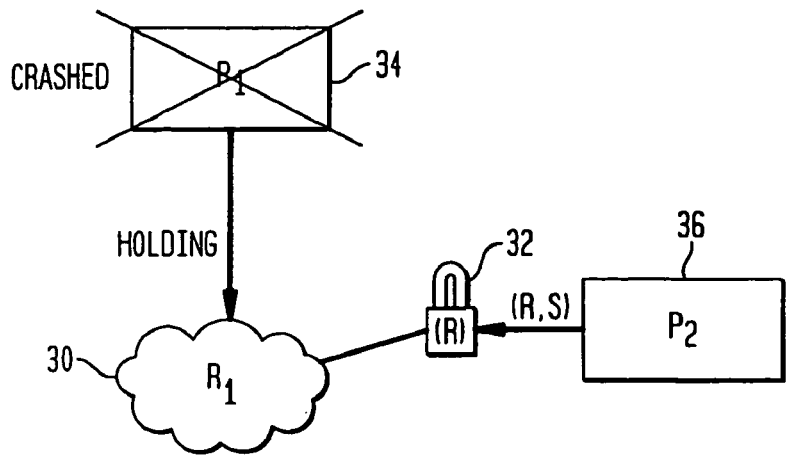

As shown in FIG. 4, the lock 32 returns the current value, R, to the inquiring processor. Since R≠0, the inquiring processor 36 determines the identity of the holding processor. P'=R % (N+1), where R % (N+1) is the remainder of R, mod(N+1), and the time, T'=R/(N+1), when the processor P' took control of the resource. Therefore, inquiring processing 36 can identify processor 34 as the holding processor and can determine if processor 34 has crashed or been rebooted since time T'. Since processor 34 has crashed, in FIG. 5, processor 36 issues a match-and-set command (M, S), where M=R, to lock 32. Since M=R, processor 36 will gain access to resource 30, effectively rescuing resource 30 from the "dead-hand" control of processor 34. If, however, processor 34 had not crashed or rebooted since time T', inquiring processor 36 would continue to issue the command (M, S), where M=0 and S=P+T*(N+1) with T being the up-to-date current time, to lock 32 until resource 30 became free, or until it determined that holding processor 36 had crashed or rebooted since time T'.

Figure 6:
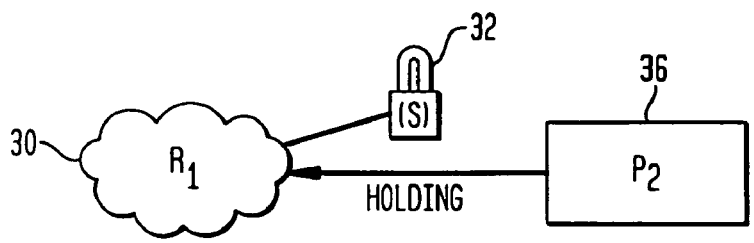
Figure 7:
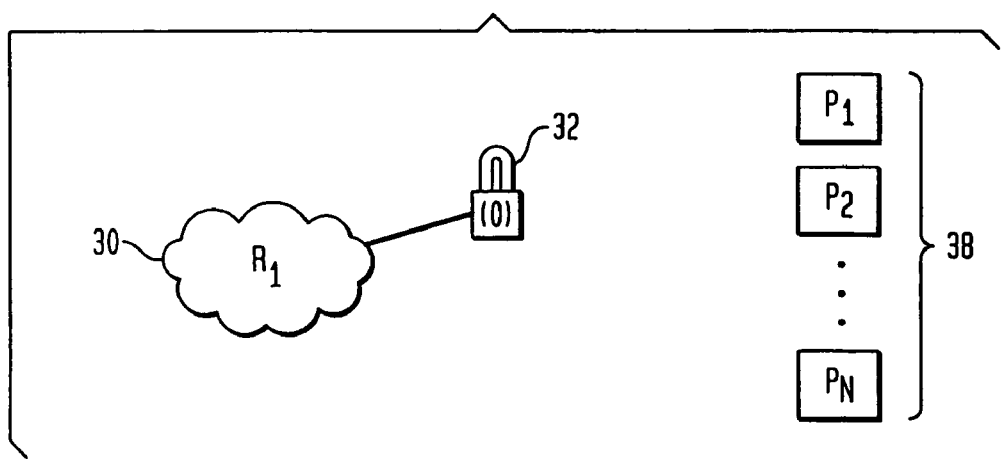

The value S, which denotes the identity of processor 36 and the time when processor 36 took control of resource 30, is now stored in lock 32, as shown in FIG. 6. At this time, an inquiring processor can determine the identity (i.e., a processor number or code assigned to processor 36) of holding processor 36 from the value S, the identity being equal to S % (N+1), which is the remainder of S, mod(N+1), and the approximate time when processor 36 took control of resource 30, which is equal to S/(N+1). When processor 36 has completed its use of resource 30, it resets the value of lock 32 to zero, and resource 30 will be available for use by other potential inquiring processors 38, as shown in FIG. 7. Thus, the match-and-set lock of the present invention allows processors to rescue a resource from a "dead" processor. Moreover, because more than one processor can try to rescue the resource at the same time, it is important to note that the present invention ensures that only one such processor will succeed. The present invention is also extremely valuable in mission-critical parallel systems, such as fault tolerant telecommunications systems, where high-availability is absolutely necessary, and the failure of individual processors should not bring down the entire system.

Figure 8:
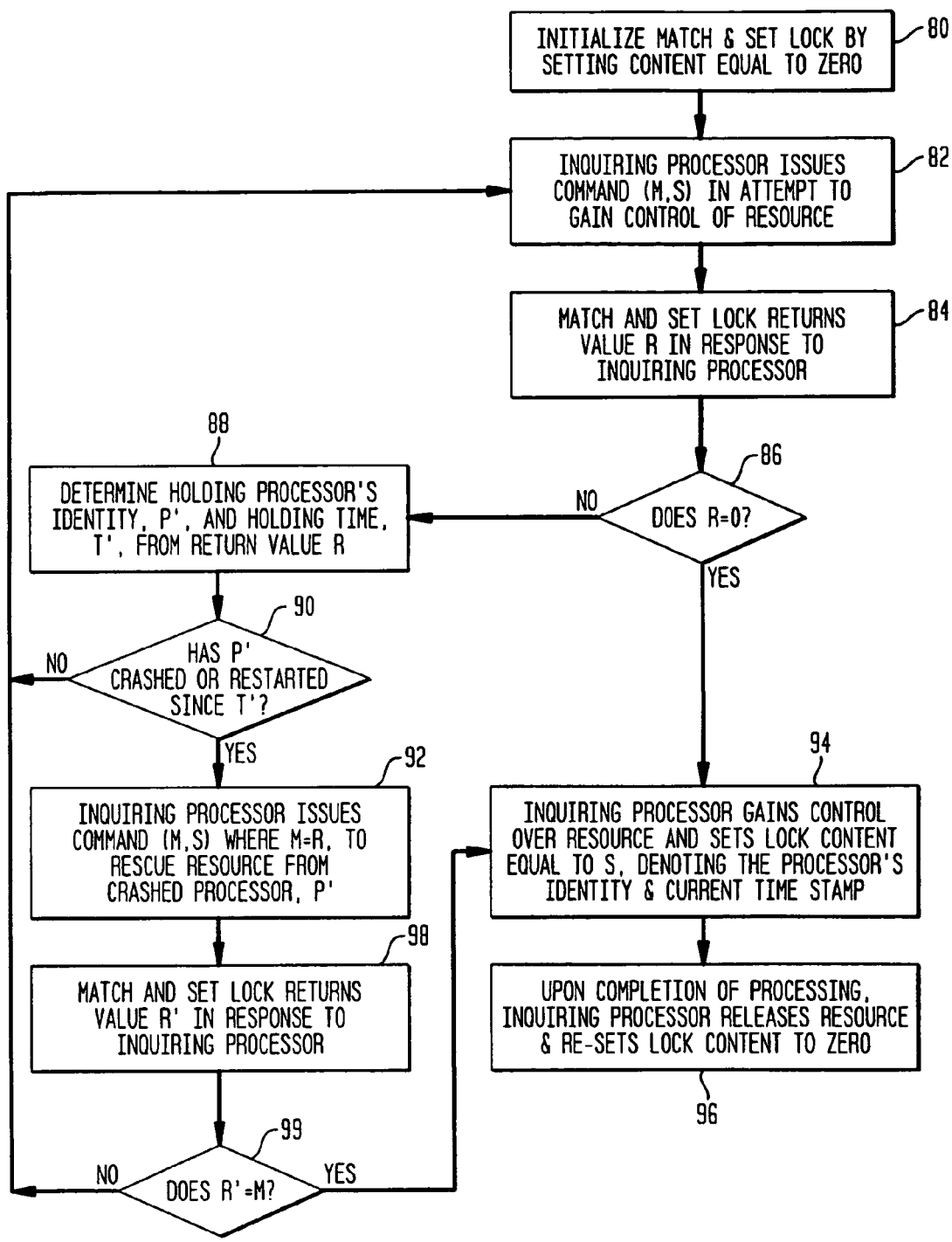
FIG. 8 is a flowchart illustrating the steps in a preferred embodiment of the method of the present invention.

Reference is now made to FIG. 8, which is a flowchart illustrating the steps in a preferred embodiment of the method of the present invention. In step 80, a "match and set" lock that controls access to a shared resource is initialized by setting the current content C of the lock equal to zero. The resource is shared by a plurality of N processors. The lock is responsive to a match-and-set command (A, B), issued by a processor, that writes B into the current content of the lock if A=C, and commits the shared resource to the control of that processor that most recently set the current content of the lock to a non-zero value. In step 82, a processor seeking access to the shared resource issues the command (M, S), where M=0 equals the expected content of a free lock, and S=P+T*(N+1) where P<(N+1) and identifies the processor issuing the command and T is a current time stamp. In step 84, the lock returns a value R in response to the inquiring processor's query. In step 86, if R=M=0, the resource has been free, and the inquiring processor succeeds in locking the lock and gaining control over the resource in step 94. In this case, the lock content will have been set to the value of S in step 84. Here S denotes the identity of the processor currently holding the lock (i.e., an identification number or code assigned to the processor in question), and the time that the holding processor gained control, as described above. In step 96, when the holding processor has completed its use of the resource, it releases the resource and resets the lock content equal to zero, signaling to other inquiring processors that the resource is free.

Returning to step 86, if R≠0, the resource is currently held by another processor (i.e., another processor has already set the lock to a non-zero value). In step 88, the inquiring processor then determines the identity of the processor that set the lock, P'=R % (N+1) where R % (N+1) is the remainder of R, mod(N+1), and the time T'=R/(N+1), when the lock was set by processor P'. In step 90, a test is made to determine if the holding processor P' has crashed or been restarted since time T' (the time when P' locked the resource). If so, the inquiring processor rescues the resource in step 92 by issuing the match-and-set command (M, S), with M=R. In step 98, the match-and-set command returns a new value R' in its response. If there is only one such processor trying to rescue this lock, then since the current content of the lock is equal to R, the match-and-set will succeed: namely R'=M in step 99. In this case, the lock is set to the value S, and the inquiring processor gains control of the resource, in step 94. Again, in step 96, when the holding processor has completed its use of the resource, it releases the resource and resets the lock content equal to zero, signaling to other inquiring processors that the resource is free. If there are more than one such processors trying to rescue this lock at the same time, only one of them will succeed: the others will all fail the test in step 99, which in turn go back to step 82 and try again from the beginning.

Returning to the test in step 90, if the holding processor P' has not crashed, or been restarted, since time T', the inquiring processor returns to step 82, and repeats the subsequent steps, as necessary, until the resource is released by its holding processor, or the inquiring processor determines that the holding processor has crashed. In the present method, a resource locked by a crashed processor in a multiprocessor system is rescued by the first processor to reset the lock with its processor ID and time stamp information, thereby eliminating the problems, and potential deadlocks, caused by multiple processors attempting to rescue the same resource at the same time.

Figure 9:
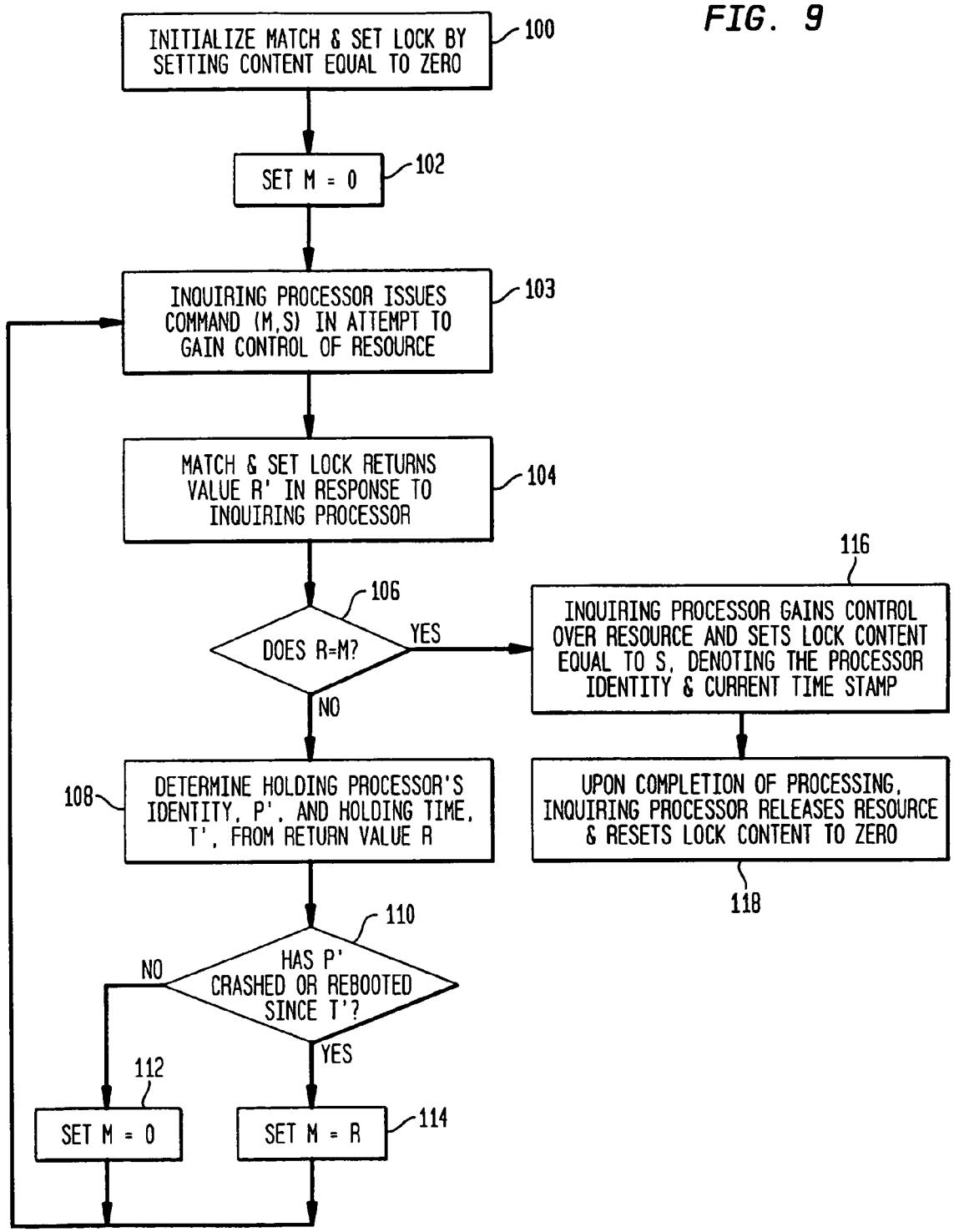
FIG. 9 is an equivalent flowchart illustrating the steps of the same preferred embodiment of the method of the present invention.

An equivalent embodiment of the present invention is depicted in the flowchart of FIG. 9. In step 100, a "match and set" lock that controls access to a shared resource is initialized by setting the current content M of the lock equal to zero in step 102. The resource is shared by a plurality of N processors. The lock is responsive to a match-and-set command (A, B), issued by a processor, that writes B into the current content of the lock if A=C, and commits the shared resource to the control of that processor that most recently set the current content of the lock to a non-zero value. In step 102, a processor seeking access to the shared resource sets M=0 which is the expected content of a free lock. In step 103 it issues the command (M, S), and S=P+T*(N+1) where P<(N+1) and identifies the processor issuing the command and T is a current time stamp. In step 104, the lock returns a value R in response to the inquiring processor's query. In step 106, if R=M, the resource has been free, and the inquiring processor succeeds in locking the lock and gaining control over the resource in step 116. Also in step 116, the lock content has been set to a value S, which denotes the identity of the processor currently holding the lock (i.e., an identification number or code assigned to the processor in question), and the time that the holding processor gained control, as described above. In step 118, when the holding processor has completed its use of the resource, it releases the resource and resets the lock content equal to zero, signaling to other inquiring processors that the resource is free.

Returning to step 106, if R≠M, the resource is currently held by another processor (i.e., another processor has already set the lock to a non-zero value). In step 108, the inquiring processor then determines the identity of the processor that set the lock, P'=R % (N+1) where R % (N+1) is the remainder of R, i.e. mod(N+1), and the time, T'=R/(N+1), when the lock was set by processor P'. In step 110, a test is made to determine if the holding processor P' has crashed or been restarted since time T' (the time when P' locked the resource). If so, the inquiring processor sets M=R in step 114, and goes back to step 103 to try to rescue the lock, by issuing the match-and-set command (M, S), with M=R.

Returning to the test in step 110: if the holding processor P' has not crashed, or been restarted, since time T', the inquiring processor sets M=0, the expected content of a free lock, and returns to step 103 and repeats the subsequent steps, as necessary, until the resource is released by its holding processor, or the inquiring processor determines that the holding processor has crashed.

While the present invention has been described with reference to the preferred embodiments, those skilled in the art will recognize that numerous variations and modifications may be made without departing from the scope of the present invention. Accordingly, it should be clearly understood that the embodiments of the invention described above are not intended as limitations on the scope of the invention, which is defined only by the following claims.

The invention claimed is:

1. A method for controlling access by N users to a resource comprising the steps of:

receiving from a user a message that requests access to said resource, which message includes a number B obtained by performing a mathematical operation that is related to a number that represents said user and to N;

in response to said message, retrieving from a predetermined location associated with said resource a stored value C that is 0 when the resource is available to any user, and other than 0 otherwise;

if C indicates said resource is available to be accessed,
  (a) sending a message to said user that includes a number D=0, and
  (b) storing B in said predetermined location, thereby replacing C with B;

if C indicates said resource is unavailable to be accessed, sending said message to said user with D=C, wherein B=P+T*(N+1), where P is a number representing said user and is not greater than N, T is a number representing a time stamp, and symbol * stands for the multiplication operation.

2. A method executed relative to a resource that may be used by any user of N users and which may be locked to prevent access to the resource, comprising the steps of:

when a user of said users desires to gain access to said resource sending, to a lock, a message that includes the number P+T*(N+1), where P, which is less than (N+1), is a number representing said user, T is a number representing a time stamp corresponding to a time when said message is sent, and symbol * stands for the multiplication operation, and receiving from said lock a value corresponding to state of said lock;

when said value is 0, said user proceeding to treat said resource as being accessible;

when said value is C≠0, indicative of another of said N users having locked said resource, said user
  (a) treating said resource as unavailable, and
  (b) sending, to said lock, a message that includes said value C and said number P+T*(N+1), and proceeding to treat said resource as being accessible;

when said user of said users desires to release said resource, thereby permitting other users to gain access to said resource, sending to said lock a message comprising elements A and B, where A is equal to said number P+T*(N+1) that was previously sent to said lock and which resulted in said user proceeding to treat said resource as being accessible, and B=0.

3. The method of claim 2 where, when said value is C≠0, and prior to said step of sending, to said lock, a message that includes said value C and said number P+T*(N+1), said user determining whether said another of said N users erroneously failed to release said resource.

* * * * *